Nov. 20, 1945.　　　G. F. FERMIER　　　2,389,190
TESTING MEANS
Filed Nov. 27, 1942
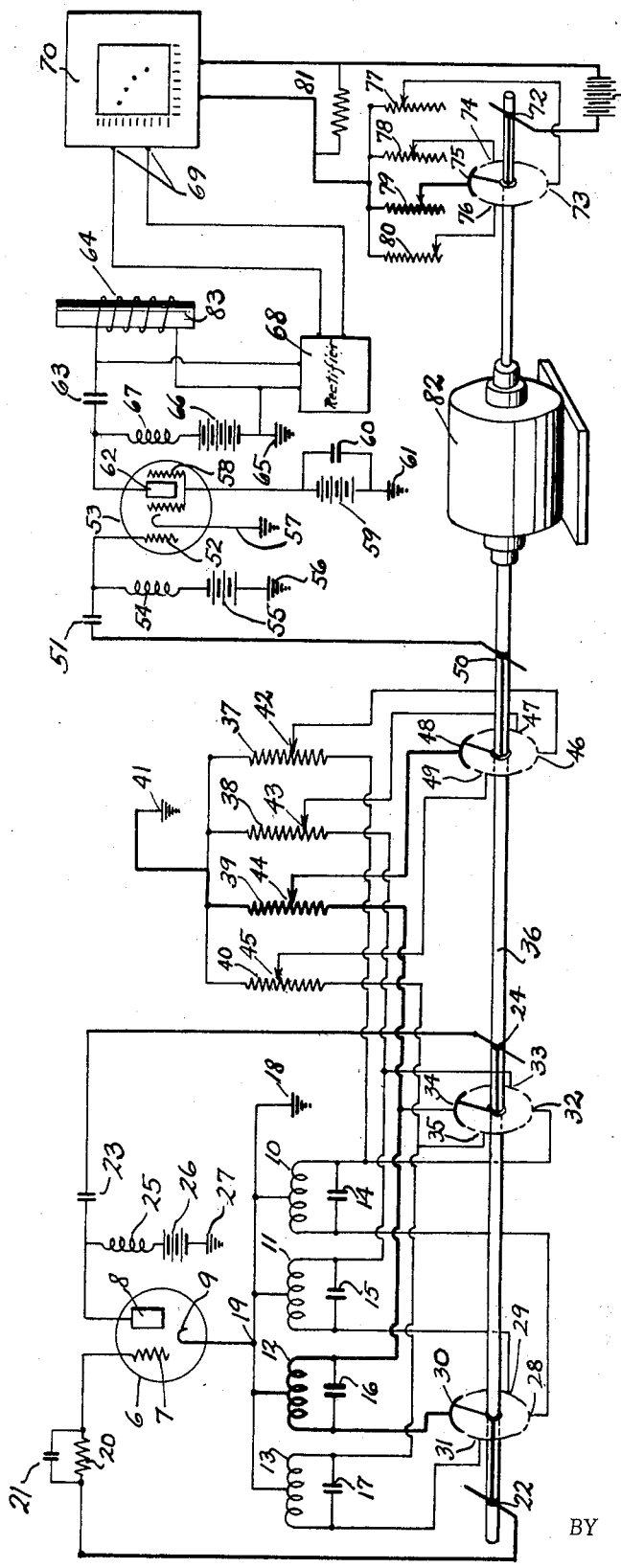
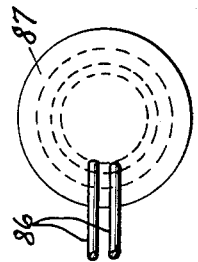
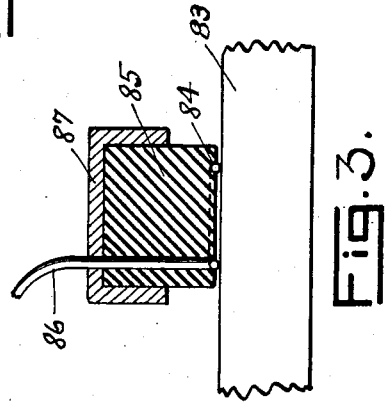
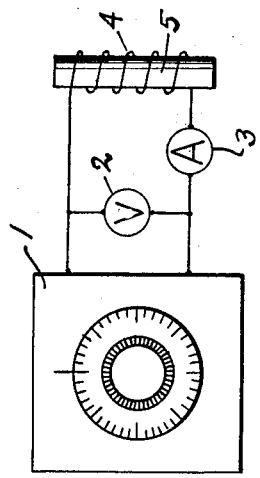
GEORGE F. FERMIER.
INVENTOR.
BY
ATTORNEYS Patented Nov. 20, 1945

2,389,190

UNITED STATES PATENT OFFICE 2,389,190

TESTING MEANS

George F. Fermier, Houston, Tex., assignor to Reed Roller Bit Company, Houston, Tex., a corporation of Texas Application November 27, 1942, Serial No. 467,101

4 Claims. (Cl. 175—183)

This invention relates to apparatus for determining the properties, for example the carbon content, of the outer layer of a body of magnetic electrically conductive material and has for its general object the provision of apparatus by which such properties may be determined without destruction of the body being tested.

In the past it has been customary in testing for the qualities and properties of the portions adjacent the surface of bodies of different materials, to make a cut through the body so as to provide a cross section thereof and then to polish the surface of the cross section and inspect it visually, or to make borings into the body and analyze the cuttings taken from different depths as the boring progresses. In other cases certain portions of the surface of a body may have been merely filed to obtain cuttings or filings for test or to determine the hardness of the body, or the surface may have been treated with an acid to determine its resistance thereto. In each case, however, the tests which have been conducted in the past for the purpose of determining the qualities and properties of the material immediately adjacent the surfaces of the bodies have been such that they were at least partially destructive of such bodies and in most cases such as to render the bodies unfit for service thereafter.

It will readily be appreciated that tests such as just referred to, while highly satisfactory for obtaining accurate results in many cases are undesirable because of the fact that they destroy or partly destroy the test piece, and that it is highly desirable that means be provided whereby the qualities and properties of a test piece may be determined without any destruction or partial destruction of the test piece. This, of course, would make possible the testing of each and every piece used if desired, whereas with previous methods it would be impossible in many cases to test the pieces that were to be used.

It is, therefore, a more specific object of this invention to provide apparatus whereby each and every piece of a given material that is to be used may be tested for the purpose of determining certain of its characteristics and properties immediately beneath and at the surface thereof.

Another object of this invention is to provide such a test which may be conducted electrically.

Another object is to provide means whereby such a test may be conducted to determine the properties of the test piece at various depths beneath its surface.

Another object of this invention is to provide an apparatus whereby the characteristics of a test piece at various depths will be automatically and for practical purposes simultaneously displayed so as to be noted almost instantaneously.

Another object of this invention is to provide an apparatus which will be completely automatic and will after having been adjusted portray visually and substantially continuously during the test the properties of the test piece at different selected depths below its surface.

One other object of this invention is to provide a means whereby the test may be applied to the surface of a test piece where such surface is flat or of some other shape which would make it impossible in practice for it to be surrounded by an induction coil.

Other objects and advantages of this invention will become apparent from the following description taken in connection with the accompanying drawing.

In the drawing:

Fig. 1 is a diagrammatic view illustrating the method and a simple form of apparatus for carrying out the method in accordance with the present invention.

Fig. 2 is an electrical diagram of an automatic apparatus constructed in accordance with this invention.

Fig. 3 is a vertical cross section through a means for applying the method of testing of this invention to a flat surface or a surface of other configuration.

Fig. 4 is a top plan view of the structure shown in Fig. 3.

It is well known that when an alternating or periodic electric current is caused to flow through a conducting solid body, most of the current so caused to flow will flow through the outer portions or layers adjacent the surface of such body. It is also known that the higher the frequency of such current the greater is its concentration near the surface of the body in which it is flowing. It is proposed by this invention to make use of these flow characteristics of alternating or periodic currents in effecting the desired tests.

In order to describe the method in its simplest form, reference is had to Fig. 1 of the drawing in which the numeral 1 indicates any suitable source of variable frequency alternating or periodic direct current, the same being provided with suitable controls for regulating its frequency, voltage and amperage. This source of current is preferably provided with a voltmeter 2 across its leads and is connected through an ammeter 3 with an induction coil 4 in which a test piece 5 is to be positioned.

In accordance with the method of the present invention the alternating current produced by the source 1 will now be set at any desired frequency depending upon the nature of the material of the test piece and the depth at which it is desired to make a test. For example, if the frequency were set at 50 cycles per second and the test piece 5 were of steel, the current induced in the test piece 5 would be concentrated principally within the outer layer thereof to a depth of roughly .076".

Now if several different homogeneous samples of steel be successively placed in the coil and the frequency of the current supply kept at 50 cycles per second and the voltage adjusted to maintain a current of the same amperage for each sample, the voltage would vary from piece to piece in accordance with changes in impedance of the circuit depending on the magnetic properties or permeability of the respective test pieces. If all of the test pieces were alike except for their carbon content, it is apparent that each particular carbon content would have a corresponding permeability and would give a corresponding voltmeter reading and the voltmeter could therefore be calibrated to read in terms of carbon content.

Now if there be placed within the coil 4 a test piece of low carbon steel that has been surface carburized or case hardened, it will be apparent that the instrument with the frequency still set at 50 cycles per second can be caused to indicate the carbon content of the outer .076 inch because the electric current does not penetrate substantially beyond that depth.

The frequency of the current source may now be changed to some different value which may be either higher or lower but which for example may be 5,000 cycles per second. For this new frequency a different amperage value should be selected because it will be understood that the induced current flowing in the test piece will be concentrated in a much thinner "skin" of the test piece than when a 50 cycle current was used. The amperage selected may be any one of a number of different values but should be sufficiently low so that the resulting induced current will not unduly heat the surface layer of the test piece and yet be sufficiently high so as to cause an appreciable voltage drop across the terminals of the coil, due to the reactance of the test piece or core.

With the new frequency setting and with the voltage regulated to maintain the newly selected current value, each of the previously used standard steel bars would again be placed within the induction coil in order to calibrate the instrument to indicate the carbon content in the now thinner outer "skin" of a test piece. With the current produced at 5,000 cycles per second the current induced in the test piece would be concentrated roughly in the outer .0076 inch of the "skin" of the test piece and the reading of the instrument would indicate the carbon content in that relatively thin outer skin.

In like manner the carbon content of any prescribed thickness of outer layer can be measured by adjusting the frequency to the proper value for any desired penetration and by subsequent calibration of the voltmeter by the use of standard test pieces as above set forth.

In order to provide a means for carrying out expeditiously the method above described, an arrangement such as set out in Fig. 2 of the drawing may be provided. Basically the device illustrated is composed of an oscillator resistance coupled to an amplifier of the tetrode tube type, an induction coil connected to the output of the amplifier, a means for placing the sample bars or test pieces in the field of the induction coil, a rectifier unit across the leads from the amplifier, a cathode ray oscilloscope having one of its sets of leads connected to the rectifier and a means connected to the other set of leads of the oscilloscope for shifting the beam of the oscilloscope by amounts corresponding to the penetrating power of the frequency of the oscillator. Referring more specifically to the drawing and to Figure 2 thereof, the left-hand end of this figure illustrates an oscillator circuit having an oscillator tube 6 with a grid 7, plate 8 and filament 9 therein, and a plurality of "tank" coils 10, 11, 12 and 13 respectively. The coils just referred to have condensers 14, 15, 16 and 17 respectively connected in parallel therewith, and the center taps of these coils are grounded at 18 and connected at 19 to the filament 9 of the tube 6. The grid 7 is connected through a grid leak 20 and a grid condenser 21 to the central terminal 22 of a rotary switch presently to be described. Likewise the plate 8 is connected through a condenser 23 to the central terminal 24 of a second rotary switch which will presently be described. The plate 8 is also connected through a coil 25 and B-battery 26 to the ground at 27.

One lead from each of the coils 10, 11, 12 and 13 is connected respectively to the terminals 28, 29, 30 and 31 of the rotary switch controlling the connection with the grid 7, so that as this rotary switch is operated each of these coils will in turn have one of its terminals connected to the grid 7 through the grid leak and condenser 20 and 21.

Likewise each of the coils has its other lead connected respectively to the terminals 32, 33, 34 and 35 of the rotary switch which controls their connection with the plate 8. Each of the coil and condenser pairs just referred to constitutes an oscillator circuit having characteristics which cause it to oscillate at a given frequency. In other words it is tuned to produce a certain frequency. The two rotary switches are mounted on the same shaft which may be called a main shaft 36 and rotate together so that when one of the terminals of any particular coil such as the coil 12 is connected to the grid 7 through one of the rotary switches the other terminal of this coil will be connected to the plate 8 through the other of these switches. At the same time, the other three coils of the bank will be disconnected from the tube 6. It will thus be seen that as the shaft 36 is rotated the oscillator will be caused to produce in turn a current of first one frequency and then another.

Now each of the coils 10, 11, 12 and 13 is connected by means of a resistance coupling exemplified by the resistances 37, 38, 39 and 40 respectively with an amplifier which will presently be described. One terminal of each of these resistances just referred to is connected to the same lead of the coils 10, 11, 12 and 13 respectively which is connected to the plate 8 when that particular coil is being used. The other end of each of the resistances 37, 38, 39 and 40 is grounded as indicated at 41. An intermediate tap is provided on each of the resistances as shown at 42, 43, 44, and 45 respectively, these taps being positioned in accordance with the amount of current which it is desired that the test piece be subjected to for the frequency being put out by the coil connected to that resistance, and these taps are connected in turn to the four terminals 46, 47, 48 and 49 respectively of a third rotary switch which is mounted on the same shaft 36 as the two previously mentioned rotary switches. The central terminal 50 of this third rotary switch is connected through a condenser 51 with the grid 52 of the tetrode tube 53. This grid is also directly connected through a coil 54 and grid battery 55 with the ground 56. The filament of this tube is also grounded at 57 and the screen grid 58 is connected through a battery 59 and a condenser 60 to the ground at 61.

The plate 62 of the tube 53 is connected through a condenser 63 to the induction coil 64 within which the test piece is to be placed. The other terminal of this induction coil 64 is grounded at 65 and a B-battery 66 is connected in series with a coil 67 between this ground connection and the plate 62. This circuit and the characteristics of the tetrode tube are such that as long as the input to the tube remains constant, a substantially constant current will flow in the coil 64.

A rectifier of any suitable design indicated at 68 is connected in parallel with the coil 64 so that the output of this rectifier will vary in accordance with the voltage in the output from the amplifier 53. The output on this rectifier is connected to two of the terminals, 69, preferably by terminals controlling the vertical position of the beam of an oscilloscope 70, so that as the voltage across the output from the amplifier varies, the vertical position of the oscilloscope beam will likewise vary. The horizontal position of this oscilloscope beam is controlled by means of a current supplied from a battery 71, one terminal of which is connected directly to the oscilloscope and the other terminal of which is connected to the central terminal 72 of a fourth rotary switch mounted on the same shaft 36. The other terminals 73, 74, 75 and 76 of this rotary switch are connected respectively to the variable resistances 77, 78, 79 and 80. The other terminals of these variable resistances are connected together and to the one remaining terminal of the oscilloscope. If desired a resistance 81 may be provided and shunted across the two terminals of the oscilloscope.

The shaft 36 may be rotated constantly during any period of test by means of a motor 82 of any suitable type.

In operation, it will be seen that when one terminal of any of the coils 10, 11, 12 and 13 is connected to the grid 7 of the tube 6, the other terminal of the same coil will be connected to the plate 8 of that tube. Thus, if the left-hand terminal of the coil 12 and the condenser 16 be connected through the first mentioned rotary switch to the grid 7, then for the same position of the shaft 36 the second mentioned rotary switch will connect the right-hand terminal of the coil 12 and the condenser 16 to the plate 8 and the oscillator will produce an oscillating current having a frequency depending upon the tuned characteristics of the coil 12 and the condenser 16. This oscillating current will at the same time be resistance coupled to the amplifier 53 by means of the resistance 39, the center tap 44 of which is connected to the amplifier 53 through third mentioned rotary switch while the shaft 36 is in the position illustrated in the drawing. This set of conditions wil produce a current in the coil 64 which current will have a predetermined value depending on the setting of the center tap 44 on the resistance 39. The voltage of this current will be determined by the magnetic or electrical characteristics of the test piece 83 within the induction coil 64, but only by such characteristics of that test piece as are manifested in the outer surface of the test piece to the depth of penetration of the induced current afforded by the frequency of the current produced by the oscillator 6. This voltage by means of the rectifier 68 and the oscilloscope 70 will be indicated by the vertical position of the beam of this oscilloscope. The horizontal position of the beam of this oscilloscope will be determined by the setting of the variable resistance 79 through which the oscilloscope will be connected to the battery 71 at the same time that the various rotary switches are in the position illustrated in the drawing. This resistance 79 is adjusted so as to indicate on the oscilloscope the penetration or thickness of the skin of the test piece in which most of the induced current will be concentrated for the frequency produced coil 12 and the condenser 16.

Likewise each of the resistances 37, 38 and 40 will have its intermediate tap 42, 43 or 45 adjusted to produce the proper current in the induction coil 64, and each of the resistances 77, 78 and 80 will be adjusted to a value that will cause the oscilloscope to indicate the depth of penetration of the corresponding induced periodic current.

From the foregoing it will be understood that when the periodic current is being produced at a frequency which is characteristic of any one coil and condenser combination such as the coil 12 and condenser 16, there will be a given depth of skin in the test piece 83 within which the corresponding induced current will be concentrated, and the characteristics of the material of the test piece within this depth will be indicated by the voltage across the coil 64. The proper current for this depth of penetration will be produced by the proper regulation of the center tap 44 of the coil 39, and the depth of penetration itself will be indicated by the oscilloscope depending upon the adjustment of the resistance 79.

As the shaft is rotated each of the coils 10, 11, 12 and 13 will in turn be connected to the oscillator, and at the same time each of the resistances 37, 38, 39 and 40 will be brought into use at corresponding instants. Simultaneously and at corresponding instants each of the resistances 77, 78, 79 and 80 will be employed so that there will appear on the oscilloscope in turn four points, each remaining for but an instant. Any one point will indicate by its vertical position the voltage across the coil 64 and by its horizontal position the frequency being employed, or the corresponding depth of penetration of the current being induced. When the shaft 36 is rotated rapidly, these points will be produced in rapid succession, one point for each different frequency of the impressed current, and the resultant will be a composite picture so that the observer will due to visual persistence see four points simultaneously, each one indicating the voltage across the coil for a given frequency and hence the characteristics of the test piece for a particular thickness of its "skin". The oscilloscope may, of course, and preferably will be provided with a scale to calibrate it along a vertical line for the characteristics of the test piece and along a horizontal line for the depth of penetration.

As heretofore mentioned, probably the most important characteristics to be determined in the case of steel would be the carbon content and this could be indicated directly on the oscilloscope by calibrating the oscilloscope along its vertical axis in terms of carbon content.

With reference to Figs. 3 and 4, these figures illustrate a means whereby the oscillating current may be employed on a body which is of such size or shape that it cannot be placed within a coil such as the coil 64. In Fig. 3 such a body is indicated at 83. A coil 84 which may be one or more flat turns of an insulated conductor is mounted in one surface of a resilient block 85 and the leads 86 from this coil may be brought up through such block. A solid backing of any suitable form such as the socket member 87 may be employed for retaining the block 85. It will be seen that if the surface of the member 83 is perfectly flat, the coil 84 will rest upon this surface and contact it at all points. However, if the surface of the body 83 is uneven, the resilient block 85 will press the different parts of the coil 84 until the insulation on the coiled conductor is in contact with the uneven surface of the body 83 at all points. By means of this expedient the coiled conductor 84 may always be brought into the same relation with respect to the surface of the body being tested, and a current will be induced in the surface of such body in the well known manner.

From the foregoing it will be apparent that a method has been provided which may be carried out by any one of a large number of different types of apparatus, which method makes it possible to determine the characteristics of a body of magnetic material in its outer portions or skin which portions are of varying thickness, and to do this without in any way destroying the piece being tested.

It is further apparent that a means has been provided whereby this method may be carried out very expeditiously so that a person can tell at a glance whether the characteristics of the skin portion of a body at different depths measure up to what is desired of them. It will be understood that while in the illustration above described the test body is referred to as being of steel and the test is referred to as being for the purpose of indicating the carbon content of the steel, the body itself may be of any magnetic material and the characteristics tested for may be any characteristics which would vary the magnetic properties of the material being tested.

It will further be appreciated that a means has been provided whereby the method of testing herein described may be applied to any magnetic body even though the shape or size of such body may be such as to prevent it from being placed within an induction coil.

The term periodic current has been used in this specification and claims as including both alternating current and pulsating direct current.

It will be seen from the foregoing that a method and means has been disclosed which is fully capable of carrying out and accomplishing all of the objects and advantages sought by this invention.

Having described my invention, I claim:

1. A means for measuring the electric properties of the surface regions of a piece of conducting magnetic material comprising, a source of periodic current capable of variation to produce currents of a plurality of different frequencies, means for interposing a plurality of different predetermined resistances to the flow of current from said source, means for causing a current flow from said source to produce a current flow in the surface regions of the piece to be measured, means for indicating the voltage of the current input to said last mentioned means, indicating means having a plurality of positions corresponding in number to the number of different frequencies which said electric current source is capable of producing, and mechanical switching means for correlating the frequency of said electric current source, the amount of resistance interposed in the current flowing from said source, and the position of said last mentioned indicating means, whereby when said mechanical switching means is in a position to cause said current source to produce any given predetermined frequency, a given predetermined resistance corresponding to said frequency will be interposed in the path of current flowing from said source and the said last mentioned indicating means will be caused to produce an indication corresponding to the frequency being produced by said current source.

2. In an apparatus of the character described, a source of periodic electric current adjustable to produce different frequencies of current, a number of resistance couplings connected to said source one for each frequency to be produced by said source, whereby the current output at each frequency may be controlled, an induction coil, means for connecting said coil to each of said couplings, means for changing the frequency of said source, means for changing the connection of said coil from one to another of said couplings to correspond with any frequency change, and means for synchronizing frequency changes of said source with changes in the connections between said coil and said couplings.

3. An apparatus of the character described comprising, a source of periodic electric current adjustable to produce different frequencies of current, a number of resistance couplings connected to said source one for each frequency to be produced by said source, whereby the current output at each frequency may be controlled, an induction coil, means for connecting said coil to each of said couplings, means for changing the frequency of said source, means for changing the connection of said coil from one to another of said couplings to correspond with any frequency change, means for synchronizing frequency changes of said source with changes in the connections between said coil and said couplings, and means for producing a visual correlation of the voltage across said coil with the frequency of said current being produced.

4. An apparatus of the character described comprising, a source of periodic electric current adjustable to produce different frequencies of current, a number of resistance couplings connected to said source, one for each frequency to be produced by said source, whereby the current output at each frequency may be controlled, an induction coil, means for connecting said coil to each of said couplings, means for changing the frequency of said source, means for changing the connection of said coil from one to another of said couplings to correspond with any frequency change, means for synchronizing frequency changes of said source with changes in the connections between said coil and said couplings, and an oscilloscope connected across said coil to produce variations in one direction indicating voltage drop across said coil, and means for impressing on said oscilloscope a plurality of different voltages corresponding in number to the different frequencies to be produced by said current source to vary said oscilloscope in a different direction, said last mentioned means being connected to said synchronizing means, whereby said oscilloscope will be varied in one direction by amounts corresponding to the voltage drop variations across said coil and in the other direction by amounts corresponding to the frequency changes of the current produced by said current source.

GEORGE F. FERMIER.